F. D. WARD.
CAR WHEEL.
APPLICATION FILED MAR. 23, 1915.
1,163,721.
Patented Dec. 14, 1915.
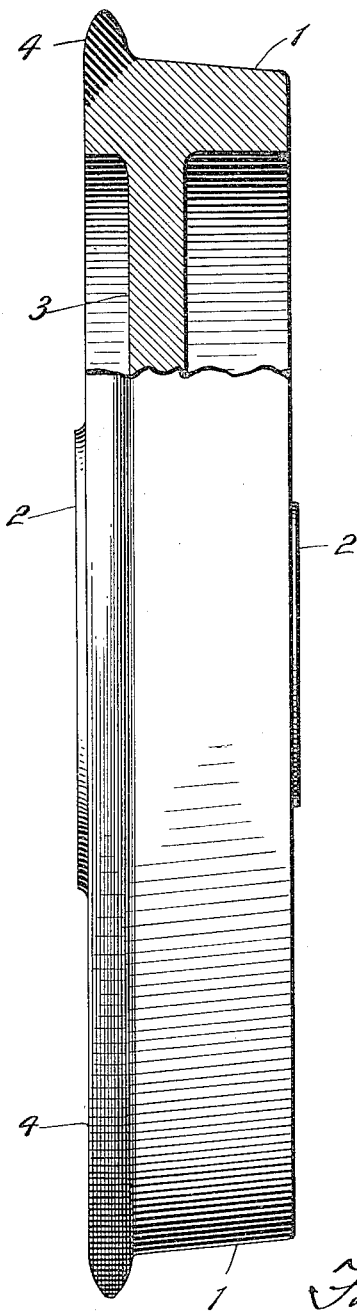
WITNESSES:
INVENTOR
Frank D. Ward
BY
ATTORNEY

UNITED STATES PATENT OFFICE.

FRANK D. WARD, OF NEW YORK, N. Y.

CAR-WHEEL.

1,163,721. Specification of Letters Patent. Patented Dec. 14, 1915.

Application filed March 23, 1915. Serial No. 16,329.

*To all whom it may concern:*

Be it known that I, FRANK D. WARD, a citizen of the United States, and a resident of the city, county, and State of New York, whose post-office address is 17 Battery Place, New York city, have made a new and useful Improvement in Car-Wheels, of which the following is a description in such full, clear, and exact terms as will enable any person skilled in the art to which it pertains to make and use the same.

My invention relates to steel car wheels.

The object is to prolong the life of the wheels and to reduce derailment and like accidents.

Reference is had to the accompanying drawing which represents a side view of my improved car wheel with a part in section.

The steel car wheel may be made in any suitable way, *i. e.*, rolled or forged and is formed with the usual tread 1, flange 4 web 3, and hub 2. The flange 4 is integral with the tread 1: the hub and web may or may not be integral.

According to my invention the tread 1, is made of the normal degree of hardness and the integral flange 4 is made materially or appreciably harder, throughout from the base to the periphery, by any known or satisfactory process of hardening and tempering.

The philosophy of my invention may be stated as follows:—In steel wheels of the usual construction (tread and flange of approximately the same texture) the continual side grinding of the flange on the rail, cuts away the flange until its edge becomes sharp. This sharp edge climbs up on the rail (particularly at switches, crossings, curves and other special work) and results either in grinding and breaking off part of the flange, at times derailing the wheel. Further the flange and tread of the wheel running (as they necessarily must) at different speeds and the flange slipping or grinding on the rail instead of rolling tends to retard the rotation of the wheel and interferes with the true rolling movement of the wheel tread on the rail which results in causing the wheel to bounce and slip its tread along the rail-ball. This has the effect of transverse ribbing and longitudinal scarring of the face of the rail-ball and wearing down or "flattening" the wheel tread;—conditions, of course, which destroy the easy movement of the rolling stock and shorten the life of the wheels and rails.

With my invention, by hardening and tempering the flange relatively to the tread, the hard flange, sliding, or shearing against the side of the tough and comparatively soft rail-ball, polishes or burnishes the same, and thereby the flange is permitted to run with a minimum of friction (as though the sides of the rail-balls were greased). The flange therefore, exerts little or no retarding effect on the wheel and allows the tread to move over the face of the rail with a true rolling action, neither injuring the rail nor the tread and allowing the nearest approach to ideal conditions which are attainable in practice with a flanged steel wheel operating on a comparatively soft steel rail.

Having thus described my invention, what I claim as new and desire to secure by Letters Patent is:—

A car wheel (designed to run on steel rails) having the tread and flange of integral steel and the flange harder than the tread, for the purpose specified.

In testimony whereof I have hereunto signed my name in the presence of two witnesses.

FRANK D. WARD.

Witnesses:
PATRICK A. BOLGER,
MARTIN BOURKE.

Copies of this patent may be obtained for five cents each, by addressing the "Commissioner of Patents, Washington, D. C."